United States Patent Office 3,585,155
Patented June 15, 1971

3,585,155
FLY ASH-ASPHALT MIXTURES
Elmer J. Hollstein, Wilmington, Del., assignor to Sun Oil Company, Philadelphia, Pa.
No Drawing. Filed Jan. 25, 1968, Ser. No. 700,363
Int. Cl. C08f 47/08, 41/12
U.S. Cl. 260—2.5
2 Claims

ABSTRACT OF THE DISCLOSURE

Novel cured products of asphalt and fly ash are produced by compression and heat-curing of mixtures of asphalt and fly ash.

This invention relates to cured asphalt compositions and the method of preparing these compositions. More particularly, the invention relates to asphalt compositions consisting essentially of fly ash.

Fly ash is the finely-divided ash generally produced by the combustion of pulverized coal in power plants. Due to its finely-divided form, the fly ash, which is carried off with the gases exhausted from the coal burning furnace, requires special collectors, usually electrostatic precipitators, to separate the ash from the exhaust. The average size of fly ash particles ranges from 1 to about 80 microns with most of the hollow articles being minute, translucent spheres. Chemically, most fly ashes consist primarily of alumina, silica, iron oxides, lime and magnesia.

Heretofore, the use of fly ash for industrial purposes has been somewhat limited, although it is available in great abundance. Primarily, it has been used as a lightweight aggregate in concrete for high rise construction and in cement mixes. Fly ash has also found use as an additive in core sand, a soil conditioner, a blasting compound for cleaning metal surfaces and as a filler in fertilizer, soap, paper, rubber and brick. See Fly Ash Symposium . . . , Electrical World, Apr. 17, 1967, pp. 97–100.

More recently, U.S. Pat. No. 3,206,319 issued to Minnick et al. discloses the use of a fly ash-asphalt composition for road surfaces. Specifically, the patent discloses a load supporting composition consisting essentially of by weight 3–8% bitumen, 1–10% fly ash (preferably 1–6% fly ash), 0.5–3.0% hydrated lime and the remainder a natural or artificial substantially chemical inert organic material aggregate. The composition is used as a readily-spreadable, rapidly-setting material which is exceedingly resistant to stripping, penetration and tearing.

Now it has been discovered that an improved, cured fly ash-asphalt composition can be produced which not only has superior building construction characteristic compared to concrete, but also finds utility as a material for pipe construction and electrical insulators. The composition, when produced in a porous state, has also found use as a porous barrier, filter, and purification medium.

In accordance with the invention, my new and useful product is obtained when 5–29% by weight asphalt and 71–95% by weight fly ash are mixed and cured. Preferably, the mixture consists of about 90–93% by weight fly ash and 7–10% by weight asphalt.

As a second embodiment of my invention, I include in the fly ash-asphalt composition, replacing some of the fly ash, a solid granular porifying agent. Said mixture upon cure will create a porous product. The mixture will contain about 5–12% by weight porifying agent, with the preferred composition containing about 9.0% by weight. Although various organic and inorganic solid porifying agents can be employed in the invention, the preferred solids are crystalline organic polymeric compositions which degrade at a temperature within the processing range herein disclosed, such as crystalline polypropylene. Other functional solids are the carbonate, sulfate and silicate salts of sodium, potassium, magnesium and calcium.

The term "asphalt" as used in the present invention is intended to be inclusive of that family of materials commonly referred to as asphalts, such as natural or petroleum residua of thermoplastic solid or semisolid consistency at ambient temperatures, normally of brown to black cementitious material in which the predominating constituents are bitumen. The bituminous material to be used may be selected from a wide variety of natural and industrial products. For instance, various natural asphalts may be used such as natural Trinidad, gilsonite and Grahamite asphalts. Petroleum asphalts suitable for the purposes of this invention include those asphalts obtained from California, Venezuela or Texas crude, tar sands, Middle East or Mid-Continent airblown oil and the like, or combinations thereof. Petroleum asphalts also include the asphalts derived from hydrocarbon feed stocks such as bitumen, asphaltic residua obtained in a petroleum refining process such as those obtained by the vacuum distillation of petroleum hydrocarbon crude oils, the solvent deasphalting of crude residuum fractions, tarry products obtained from the chemical refining of high molecular weight hydrocarbons, the asphaltic material obtained in the thermal or catalytic cracking of petroleum to obtain gasoline or other light fractions or any combination of these materials.

As a general embodiment of my invention, the desired weight percents of fly ash and asphalt are mixed, preformed compressed and cured. The mixture can be compressed with a molding pressure within the range of from 1000 to 6000 p.s.i. at ambient temperature, and cured for a period of from 1 to 6 hours, and at a temperature of 350° F. to 500 F. It has been found that the optimum conditions resulting in the highest compressive strength for the cured material are a molding pressure of 6000 p.s.i. and a cure for 4 hours at 450° F.

EXAMPLE I

As a specific embodiment of my invention, a mixture of 90% fly ash and 10% asphalt, by weight, was well mixed, preformed, compressed to 4000 p.s.i. at ambient temperature and cured at 450° F. for 4 hours to form a nonporous full size 8" x 8" x 16" two-core type building block.

The fly ash used in this mixture was obtained from the Edgemoor (Delaware) Power Plant. The fly ash is rich in iron oxides and is quite paramagnetic. Its metallic composition is given in Table 1.

TABLE 1

Metallic composition of Edgemoor fly ash

| | Weight percent |
|---|---|
| Iron | >10 |
| Nickel | 0.18 |
| Vanadium | 0.05 |
| Copper | 0.07 |
| Chromium | 0.20 |
| Calcium | 2.75 |
| Aluminum | >10 |
| Silicon | >10 |

The asphalt employed was obtained through a vacuum tower distillation of a West Texas crude oil. The asphalt had a molecular weight of 815 and an H/C ratio of 1.42. The viscosity at 210° F. was 1169 cs. Upon fractionation, the asphalt yielded approximately 14 weight percent asphaltenes, 25 weight percent nonhydrocarbons, 31 weight percent aromatics and 30 weight percent saturates.

The fly ash-asphalt material obtained after cure was tested for physical properties and those results, along with results for a comparable concrete block, are given in Table 2.

TABLE 2.—PHYSICAL PROPERTIES OF FLY ASH-ASPHALT BLOCK

| | Fly ash-asphalt | Concrete |
|---|---|---|
| Compressive strength, p.s.i. | 3,480 | 1,100-1,500 |
| Density, lbs./cu. ft. | 111 | 94 |
| Specific gravity | 1.78 | 1.5 |
| Electrical resistivity, megohms/inch | >1,000 | |

The product is black and very smooth and is easily drilled and worked with ordinary tools. It is comparable in density, but stronger than concrete and is attracted to magnet due to its high iron content. It is impervious and chemically resistant.

The material was tested for its electrical resistance capabilities and was found to have substantially infinite resistance. This, of course, lends to the possibility of the material being employed as an electrical insulator to impede the flow of current where such function is required.

EXAMPLE II

A similar method as used in Example I was employed for forming a porous block. The composition consisted of 9.0 weight percent crystalline polypropylene, 9.9 weight percent asphalt and 81.0 weight percent fly ash. The fly ash and asphalt were the same composition as in Example I.

The material obtained had the following physical properties after cure:

Compressive strength—1860 p.s.i.
Density—83.5 pounds per cubic foot
Specific gravity—1.34

The pores in the material had diameters which range from 1.2 to 76.2 microns with an average diameter of about 5.1 microns. The block passed nitrogen readily at <5 p.s.i.g.

The cured porous mixture has been found to be effective as an ion exchange medium in removing ions of the transition metal elements of the fourth period of the Periodic Table. As an example of the ion removal properties, 59.5 grams of crushed porous block were packed into a 100 ml. burette, and a solution of $CuSO_4$ was percolated therethrough without recycle. $Cu(OH)_2$ is formed in the pores of the material and remains trapped. The copper can subsequently be removed by complexing with ammonium hydroxide. The results of the test are shown in Table 3.

TABLE 3.—REMOVAL OF $Cu^{++}$ ION VIA POROUS FLY ASH-ASPHALT BLOCK

| Cut number | Total vol. through column | Effluent product ion content, p.p.m. Cu |
|---|---|---|
| Original | 0 | 775 |
| 2 | 10 | 532 |
| 4 | 21 | 410 |
| 6 | 32 | 300 |
| 8 | 42 | 190 |
| Over night rest period | | |
| 12 | 63 | 21 |
| 14 | 74 | 11 |
| 16 | 92 | 14 |
| 18 | 108 | 16 |
| 20 | 125 | 16 |
| 22 | 143 | 22 |
| 24 | 162 | 24 |
| 26 | 181 | 15 |

The results show that the porous material immediately begins to remove substantial $Cu^{++}$ from the solution. After the material becomes fully-wetted with $CuSO_4$ solution, the removal was enhanced considerably. This is borne out considerably by the results after the overnight rest period in which the solution remained in contact with the fly ash-asphalt porous mixture, but was not percolated therethrough.

While the particular compositions and method of application described herein are well adapted to meet the objects of the present invention, various modifications or changes may be resorted to without departing from the scope of the invention as defined in the claims.

I claim:
1. A cured, porous product which comprises about 5–29% by weight asphalt, 59–90% by weight fly ash, and 5–12% by weight solid granular, crystalline polypropylene porifying agent which degrades at 350° to 500° F., and prepared by
   (a) mixing the desired portions of asphalt and fly ash,
   (b) pre-forming the mixture into the desired shape,
   (c) compressing the pre-form at a pressure in the range of 1000 to 6000 p.s.i., and
   (d) curing the compressed form at a temperature in the range of 350° F. to 500° F. for a period of from 1 to 6 hours.
2. A cured, porous product as described in claim 1 which comprises about 7–10% by weight asphalt, 78–88% by weight fly ash and 5–12% by weight solid, granular, crystalline polypropylene porifying agent which degrades at 350° to 500° F.

References Cited

UNITED STATES PATENTS

| 3,281,256 | 10/1966 | Rogers et al. | 106—281 |
| 3,287,146 | 11/1966 | Rogers et al. | 106—281 |
| 3,257,336 | 6/1966 | Levy et al. | 260—2.5 |

OTHER REFERENCES

Raff et al.—High Polymers (vol. 20) Crystalline Olefin Polymers (Part 1) (Wiley) (N.Y.) (1965)—page 828.

MORRIS LIEBMAN, Primary Examiner

H. H. FLETCHER, Assistant Examiner

U.S. Cl. X.R.

106—281; 260—28.5, 41